United States Patent [19]

Harigai et al.

[11] Patent Number: 5,347,365
[45] Date of Patent: Sep. 13, 1994

[54] DEVICE FOR RECEIVING CLOSED CAPTIONED BROADCASTS

[75] Inventors: Masami Harigai; Hiroyasu Kishi, both of Gunma, Japan

[73] Assignee: Sanyo Electric Co., Ltd., Osaka, Japan

[21] Appl. No.: 948,684

[22] Filed: Sep. 22, 1992

[30] Foreign Application Priority Data

Sep. 27, 1991 [JP] Japan .................. 3-249709

[51] Int. Cl.⁵ ............................. H04N 5/445
[52] U.S. Cl. ................... 348/525; 331/11; 331/34; 348/476; 348/540
[58] Field of Search ............ 358/195.1, 148, 158, 358/159, 149, 147, 183, 142; 331/10, 11, 16, 20, 34, 36 C

[56] References Cited

U.S. PATENT DOCUMENTS

| | | | |
|---|---|---|---|
| 4,250,525 | 2/1981 | Steckler et al. | 358/148 |
| 4,791,488 | 12/1988 | Fukazawa | 358/148 |
| 4,792,768 | 12/1988 | Fried et al. | 331/11 |
| 4,814,878 | 3/1989 | Kishi et al. | 358/158 |
| 4,920,322 | 4/1990 | Ruijs | 331/34 |
| 5,043,813 | 8/1991 | Christopher | 358/159 |
| 5,150,201 | 9/1992 | Mehrgardt et al. | 358/149 |

Primary Examiner—Mark R. Powell
Assistant Examiner—Jeffrey S. Murrell
Attorney, Agent, or Firm—Harold L. Burstyn

[57] ABSTRACT

A synchronizing/separator circuit separates a horizontal synchronizing signal and a vertical synchronizing signal contained within a television signal. A phase locked loop synthesizes a clock signal at 32 fH by phase locking the horizontal synchronizing signal with a divided version of the 32 fH clock signal. The phase locked loop includes a voltage controlled oscillator (VCO) responsive to the phase comparison to perform the phase lock. A circuit separates the run-in clock and caption data in horizontal scanning period 21 H in the vertical blanking interval. A phase comparator receives the run-in clock and phase compares it with the 32 fH clock to produce an alternating control signal which is applied directly to the voltage controlled oscillator for rapid phase locking of the voltage controlled oscillator in preparation for decoding the caption data. The voltage controlled oscillator is controlled by the charging and discharging rate of a capacitor charged by a constant current source. The control signal varies the charging and discharging rate of the capacitor to effect rapid phase lock to the run-in clock.

7 Claims, 6 Drawing Sheets

FIG. 8(a)
FIG. 8(b) SR-FF
FIG. 8(c) 90° PHASE
FIG. 8(d) RUN-IN CLOCK
FIG. 8(e) SECOND H PC L

DEVICE FOR RECEIVING CLOSED CAPTIONED BROADCASTS

BACKGROUND OF THE INVENTION

The present invention relates to a device for receiving a closed caption broadcasting signal for display on a television (TV) screen. Closed caption broadcasting is provided for those viewers in the United States who have hearing disabilities.

A closed caption broadcasting system can display a closed caption containing dialogue, announcements and the like on a TV signal being displayed on a TV screen. The U.S. closed caption system, which is quite similar to the Japanese system, is a multiple character broadcasting system. In this system, closed caption data is transmitted and superimposed within a vertical blanking period of a television signal. The data transmission of the closed caption data is based on a code system.

A character generator in a TV receiver responds to codes in the transmitted signal to display the desired characters on the TV screen the moment the corresponding codes are transmitted.

There are generally two kinds of display modes available for displaying closed caption data, Text Mode and Caption Mode. In Text Mode, a maximum of 15 lines by 32 characters can be displayed in the center of the TV screen. In Caption Mode, the closed caption characters can be displayed only on upper or lower portions of the TV screen, for example, in a space between the 1st and 4th TV scan lines or a space between the 12th and 15th TV scan lines.

Figures 2A, 2B, 2C:
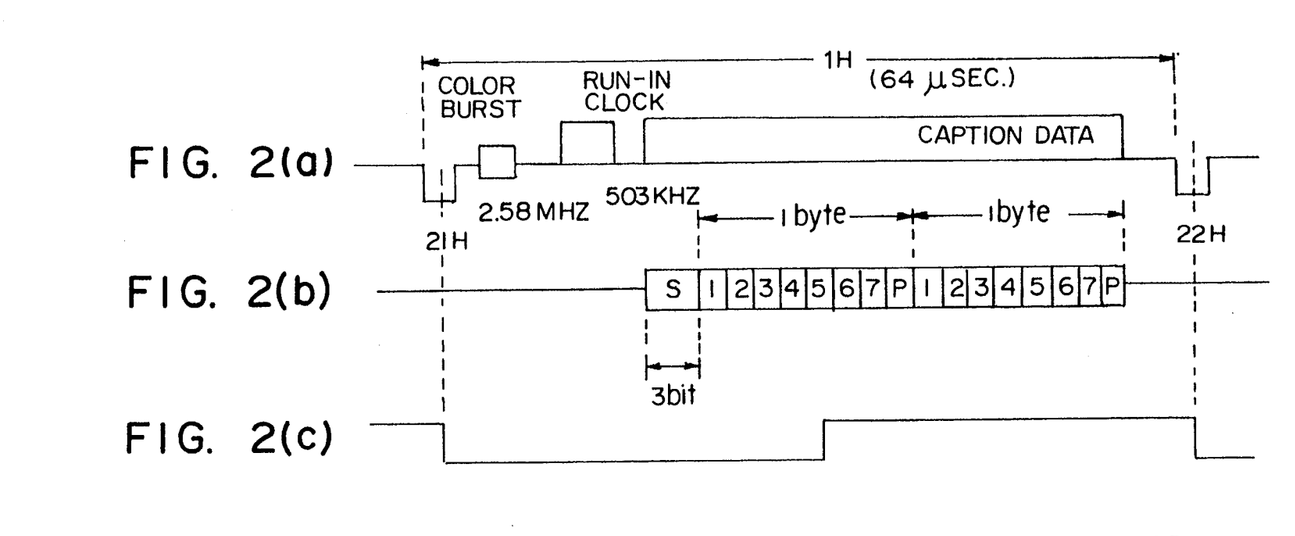
FIGS. 2(a) through 2(c) are waveforms to which reference will be made in explaining the closed caption broadcasting device.

Referring to FIG. 2(a), the closed caption broadcasting data are superimposed in a vertical blanking period 21 H (H means a horizontal scanning period. 21 H means the 21st horizontal scanning period during the vertical blanking period i.e. line 21) of the transmitted TV signal being displayed. Vertical blanking period 21 H is shown as a composite signal containing a 3.58 MHz color burst signal, a 503 Khz run-in clock and a predetermined amount of closed caption data.

Referring to FIG. 2(b), the closed caption data includes a 3-bit start signal followed by an 8-bit string consisting of a data bit string of 7 bits plus a parity bit. The 8 bits of data, including the parity bit, may be considered as one unit which commands the character codes and a command code defining a position (row and column) or color of the characters to be displayed.

Figure 3:
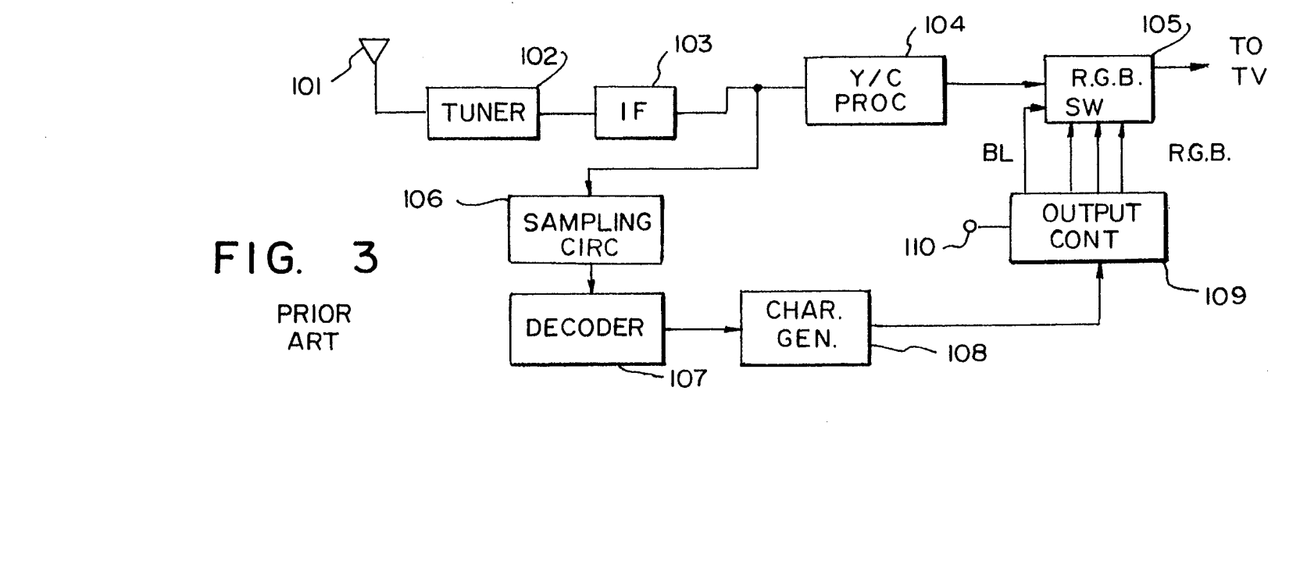
FIG. 3 is a block diagram of a conventional closed caption broadcasting device in which an automatic frequency control of the present invention may be employed.

Referring now to FIG. 3 a conventional receiver for displaying the closed caption data in the closed caption broadcasting system includes an antenna 101 which applies the television signal to a tuner 102. An intermediate frequency amplifying circuit 103 amplifies and detects the television signal to produce a detected output for connection to a Y/C (Luminance/Chroma) processing circuit 104 which applies the resulting primary colors of Red(R), Green(G) and Blue(B) to an RGB switching circuit 105.

The detected signal from intermediate frequency amplifying circuit 103 is also applied to a sampling circuit 106 which passes only the caption data in 21 H to a decoder 107. Decoder 107 conducts a parity check on the caption data, to confirm that it receives valid closed caption data from the television signal. When the parity check is successful, decoder 107 applies the decoded caption data to a character generator 108. Character generator 108 produces the desired closed caption characters for display at a desired position on the screen.

The output of character generator 108 is applied to an output control circuit 109. Output control circuit 109 applies the three primary color signals RGB necessary to display the characters, and to control their color, to switching circuit 105. The desired closed caption characters are thus displayed on the TV screen.

Sampling circuit 106 samples the caption data under control of a clock actuated counter. The clock is synchronized with the television signal for correct display of the closed caption data on the TV screen. To assure synchronization of the clock, it is convenient to use an Automatic Frequency Control (AFC), such as shown as circuit 3 (of FIG. 1), phase locked to the horizontal synchronizing signal in the transmitted television signal. More specifically, a signal as shown in FIG. 2(c), derived from a frequency dividing circuit in automatic frequency control circuit 3, is compared with the horizontal synchronizing signal in FIG. 2(a). Based on the results of the comparison, the frequency of the clock signal is controlled to equal the horizontal frequency of tile television signal.

Accurate synchronization of the automatic frequency control circuit with the run-in clock is vital for proper display of caption data. Incorrect synchronization may prevent correct decoding of the caption data, thereby preventing accurate sampling and display of the caption data.

OBJECTS AND SUMMARY OF THE INVENTION

It is an object of the present invention to provide an automatic frequency control circuit which overcomes the drawbacks of the prior art.

It is a further object of the invention to provide an automatic frequency control circuit that phase locks itself to the run-in clock contained in 21 H of the transmitted TV signal.

It is a further object of the invention to provide an automatic frequency control circuit that has a substantially broader tuning range, whereby accurate phase lock of the automatic frequency control circuit output to the run-in clock can be attained rapidly.

Briefly stated, the present invention provides a synchronizing/separator circuit which separates a horizontal synchronizing signal and a vertical synchronizing signal contained within the television signal. A phase locked loop synthesizes a clock signal at 32 fH by phase locking the horizontal synchronizing signal with a divided version of the 32 fH clock signal. The phase locked loop includes a voltage controlled oscillator (VCO) responsive to the phase comparison to perform the phase lock. A circuit separates the run-in clock and caption data in horizontal scanning period 21 H in the vertical blanking interval. A phase comparator receives the run-in clock and phase compares it with the 32 fH clock to produce an alternating control signal which is applied directly to the voltage controlled oscillator for rapid phase locking of the voltage controlled oscillator in preparation for decoding the caption data. The voltage controlled oscillator is controlled by the charging and discharging rate of a capacitor charged by a constant current source. The control signal varies the charging and discharging rate of the capacitor to effect rapid phase lock to the run-in clock.

According to an embodiment of the invention, there is provided a device for receiving and decoding caption data multiplexed within a television signal and displaying character information contained in the data on a television screen, comprising: means for defining a particular horizontal interval containing caption data, an automatic frequency control circuit, the automatic frequency control circuit including a voltage controlled oscillator, means for permitting the voltage controlled oscillator to lock onto a phase of a horizontal synchronizing signal in the television signal, means for sampling a run-in clock signal in the particular horizontal interval, means for phase-comparing the run-in clock signal with an output signal of the voltage controlled oscillator, and for producing an oscillating control signal in response thereto, and a control circuit applying the control signal to the voltage controlled oscillator.

According to a feature of the invention, there is provided a device for receiving and decoding closed caption broadcasting data multiplexed within a television signal and displaying character information contained in the data on a television screen, comprising: a synchronizing/separator circuit for separating a horizontal synchronizing signal and a vertical synchronizing signal contained within the television signal, an automatic frequency control circuit, the automatic frequency control circuit including a voltage controlled oscillator, means for charging and discharging a capacitor from a constant current source, an output frequency of the voltage controlled oscillator being controlled by a charging and discharging rate of the capacitor, a first phase comparator, the first phase comparator receiving the horizontal synchronizing signal and an output of the output frequency, and including means for producing an error signal in response to differences in its inputs, a low pass filter receiving the error signal and effective to produce a filtered error signal, the automatic frequency control circuit being responsive to the filtered error signal for locking the output and the horizontal synchronizing signal in phase, means for sampling a run-in clock signal encoded within the television signal, a second phase comparator for phase-comparing the sampled run-in clock signal with an output signal of the voltage controlled oscillator, and a control circuit for varying the voltage controlled oscillator output signal according to an output signal of the second phase comparator.

According to a further feature of the invention, there is provided a device for phase locking a signal to a run-in clock in a predetermined horizontal line in a television signal, comprising: means for selecting the predetermined horizontal line, a phase locked loop, the phase locked loop including a voltage controlled oscillator, the voltage controlled oscillator including means, responsive to a charging and discharging rate of a capacitor, to control an output frequency thereof; a phase comparator, the phase comparator including means for comparing a phase of the output frequency with a phase of the run-in clock, and means, responsive to the phase comparator, for altering the charging rate in a direction effective to adjust a phase of the output frequency to a desired relationship with a phase of the run-in clock.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 4(a) through 4(e) are wave forms to which reference will be made explaining the embodiment in FIG. 1.

DETAILED DESCRIPTION OF PREFERRED EMBODIMENTS

Figure 1:
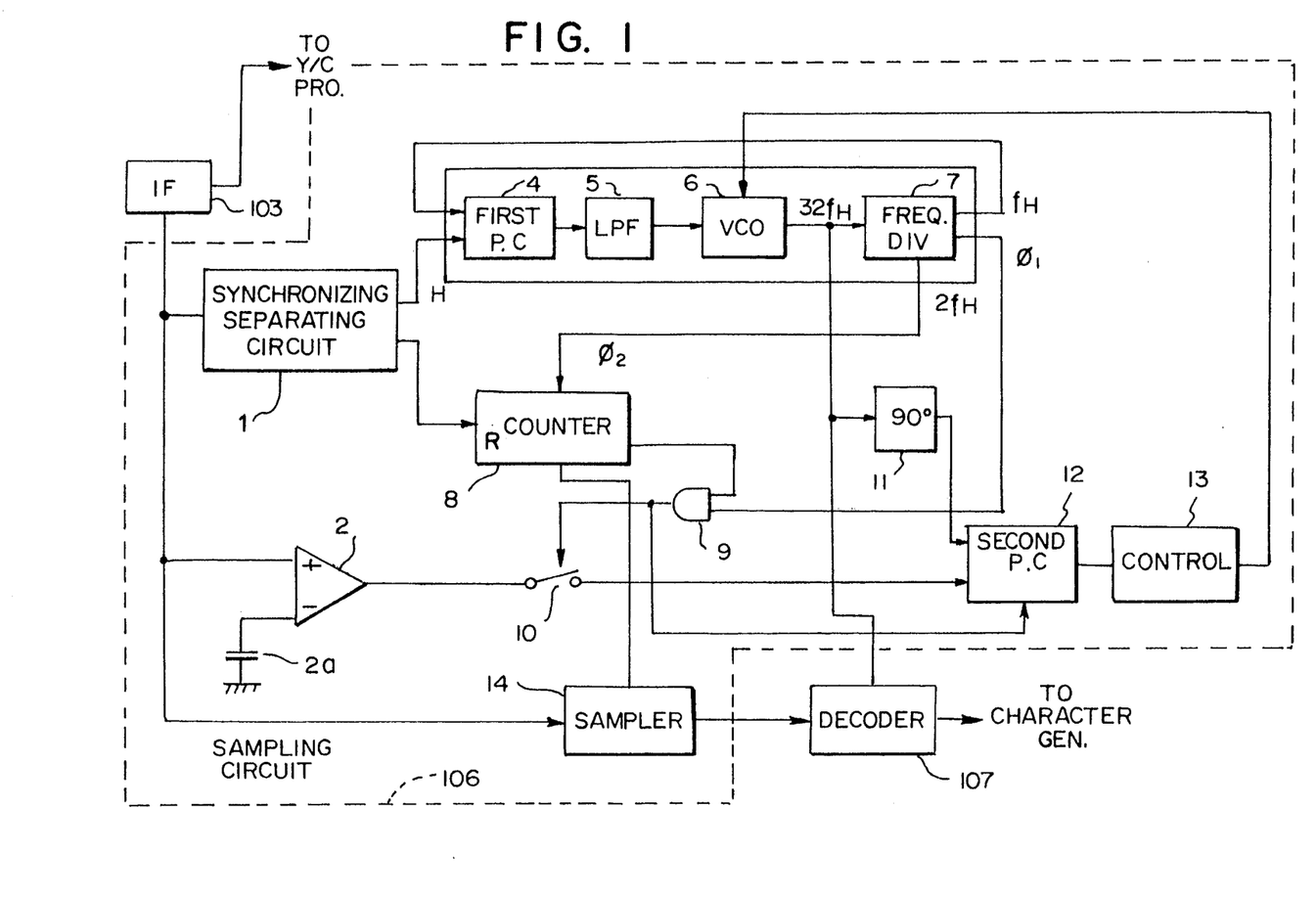
FIG. 1 is a circuit diagram of a portion of device for receiving closed caption broadcasting according to an embodiment of the present invention.

Referring now to FIG. 1, sampling circuit 106 includes a synchronizing/separating circuit 1 receiving the television signal from intermediate frequency amplifying circuit 103. Synchronizing/separating circuit 1 connects a vertical synchronizing signal (V) to a counter 8, and a horizontal synchronizing signal (H) to a first low pass filter 4 in an automatic frequency control circuit 3. The output of intermediate frequency amplifying circuit 103 is also connected to the + input of a comparator 2. The inverting input of comparator 2 is coupled to a negative standard power source (illustrated as a battery 2a) corresponding. The voltage from battery 2a is equal to an average DC voltage level of the run-in clock (FIG. 2(a)), thereby being effective to remove the lower-level color burst signal from the television signal received from the intermediate frequency amplifying circuit 103.

An automatic frequency control circuit 3 includes a first phase comparator 4, receiving the horizontal synchronizing signal (H). In addition, phase comparator 4 receives a feedback signal, to be described later, at a second input thereof. The output of first phase comparator 4 is an error voltage which varies according to the phase relationship of its two inputs. The error voltage from phase comparator 4 is connected to an input of a first low pass filter 5 in which said error signal is converted into a DC voltage. The resulting filtered DC voltage is fed to the input of a voltage controlled oscillator (VCO) 6.

Voltage controlled oscillator 6 produces an output frequency which varies according to the DC voltage it receives from first low pass filter 5. The nominal output frequency of voltage controlled oscillator 6 is 32 fH. This 32fH signal is connected to a 32x frequency divider circuit 7 where it is counted down to produce an output signal having a frequency equal to the horizontal frequency H. This signal from frequency divider circuit 7 is fed back to first phase comparator 4. Thus, the output of phase comparator 4 is a DC voltage which varies in relationship to the phase relationship between the horizontal synchronizing signal from synchronizing-/separating circuit 1, and the signal at the same frequency produced by frequency divider 7. Responding to this DC voltage, the frequency of the signal produced by voltage controlled oscillator 6 is controlled to keep these two inputs to first phase comparator 4 in a substantially constant phase relationship.

In conventional systems, low pass filter 5 includes a substantial amount of filter capacitance. Thus, the overall response of automatic frequency control circuit 3 is slow. In addition, the phase control achieved by automatic frequency control circuit is relatively coarse compared to that required for accurate decoding and display of caption data.

To solve this problem, additional circuits are contained in the embodiment of FIG. 1 to fine tune the phase of the output of voltage controlled oscillator 6 immediately before the reception of caption data.

Frequency divider 7 also produces a $\phi_2$ signal at a frequency 2 fH for application to a counter 8, outside the closed loop of automatic frequency control circuit 3. Counter 8 is reset by the vertical synchronizing signal (V) from synchronizing/separating circuit 1. Upon receipt of the 42nd cycle of the 2 fH $\phi_2$ signal, counter 8 produces an output for the duration of the 21 H scan line.

One output of counter 8 is connected to an input of a sampler 14. The output of intermediate frequency amplifying circuit 103 is connected to the second input of sampler 14. Sampler 14 is thus enabled during 21 H to pass the caption data received from intermediate frequency amplifying circuit 103 to decoder 107.

A second output of counter 8 is connected to one input of an AND gate 9. A second input of AND gate 9 receives an output $\phi_1$ from frequency divider 7. The output $\phi_1$ coincides with the occurrence of the run-in clock (FIG. 2(a)). The output of AND gate 9 is a gate pulse, occurring during the run-in clock portion during 21 H. This gate pulse is applied as a control signal to a switch 10, and to an input of a second phase comparator 12.

As noted above, a threshold voltage applied to the—input of comparator 2 has a DC value exceeding the average amplitude of the color burst signal. Thus, comparator 2 blocks the color burst signal and passes the remainder of the signal to a switch 10. Switch 10 is energized by the output of AND gate 9 only in a time period encompassing the run-in clock in 21 H.

The signal passing through switch 10 is connected to a second input of second phase comparator 12. A 90-degree phase shifter 11 receives the 32 fH output of voltage controlled oscillator 6 at its input, and produces a 90-degree phase shifted output for connection to a further input of second phase comparator 12. Second phase comparator 12 performs quadrature detection based on the 90-degree phase shifted output of phase shifter 11 and the run-in clock portion of the television signal connected thereto through switch 10.

A control circuit 13 applies the output of second phase comparator 12 to voltage controlled oscillator 6. This output is applied as a second control input to voltage controlled oscillator 6 to control the frequency therein based the result of second phase comparator 12.

A data sampling circuit 14 receives a gate output of counter 8 during the occurrence of the caption data in 21 H, and connects the caption date during that period from the output of intermediate frequency amplifying circuit 103 to the input of decoder 107. The second input of decoder 107 receives the 32 fH signal from voltage controlled oscillator 6. The 32 fH signal is used in decoder 107 to clock out the caption data for application to the character generator 108 (FIG. 1).

Figures 4A, 4E:
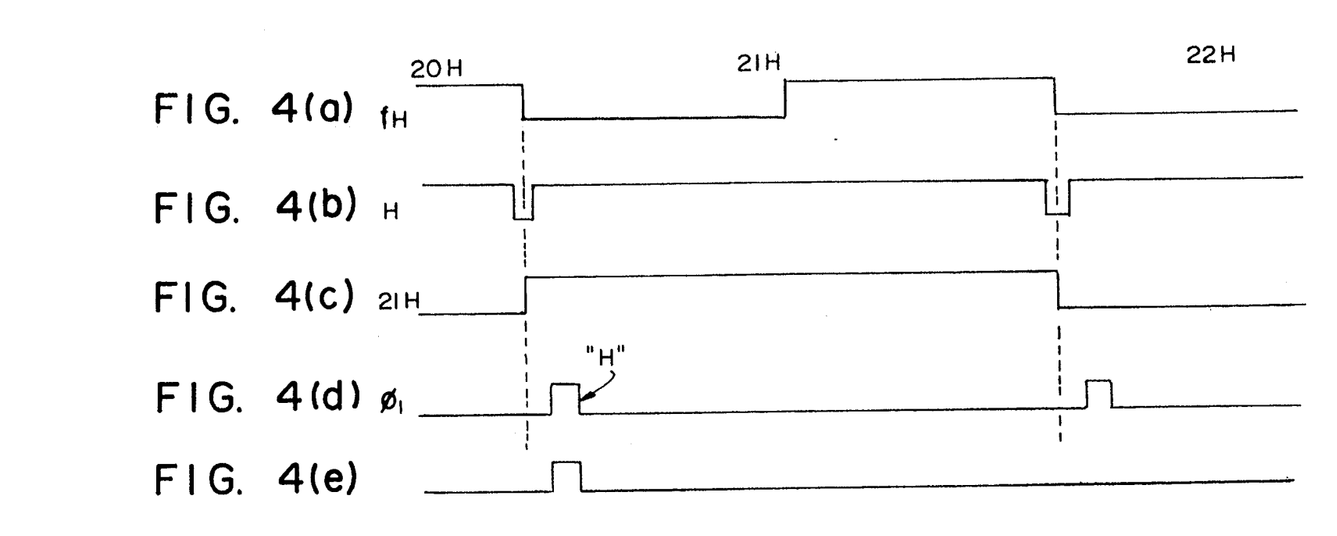

Referring to FIG. 4(a), the output signal of voltage controlled oscillator 6 is synchronized with the horizontal synchronizing signal, shown in FIG. 4(b).

The 2 fH clock signal from frequency divider 7 is applied as a second output signal $\phi_2$ to counter 8 (FIG. 1). Counter 8 is reset by the occurrence of each vertical synchronizing signal, thereupon it begins to count the cycles of second output signal $\phi_2$. Upon the occurrence of 21 H, counter 8 produces a "H" level signal, as shown in FIG. 4(c). That is, the output of counter 8 corresponds to the period of the run-in clock in one horizontal line period. The "H" level signal from counter 8 is applied to one input of AND gate 9. The first output signal $\phi_1$, applied to the second input of AND gate 9 enables AND gate 9 for the short period shown in FIG. 4(e), only during 21 H. This output of AND gate 9 closes switch 10, and enables second phase comparator 12. During the period when switch 10 is closed, and second phase comparator 12 is enabled, second phase comparator performs quadrature detection of the run-in clock and the 90-degree phase-shifted 32 fH signal from voltage controlled oscillator 6.

The output of second phase comparator 12, passing through control circuit 13 to voltage controlled oscillator 6, adjusts the phase of voltage controlled oscillator 6 to lock the phase of voltage controlled oscillator 6 to the phase of the run-in clock. Since the run-in clock closely precedes the caption data in 21 H, phase locking to the run-in clock in this manner ensures close synchronization between the output of voltage controlled oscillator 6 and the incoming caption data.

Figure 5:
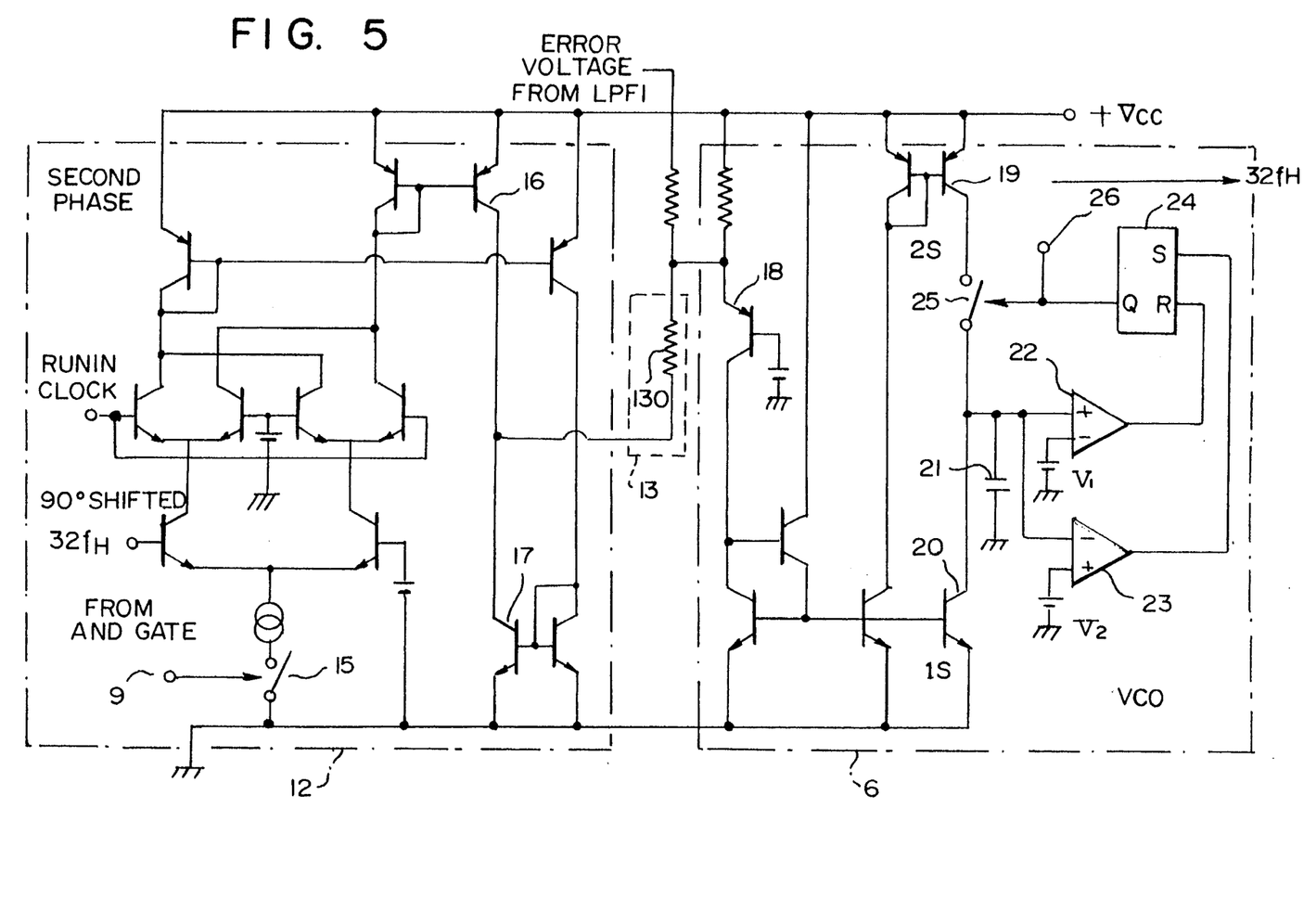
FIG. 5 is a detailed circuit diagram of portions of the embodiment of the invention of FIG. 1.

Referring now to FIG. 5, a detailed schematic diagram shows details of second phase comparator 12, control circuit 13 and voltage controlled oscillator 6, described above. A switch 15 of second phase comparator 12 is connected in series with a current source and ground. Switch 15 is normally open, but is closed by the enable signal received from AND gate 9 during the occurrence of the run-in clock. When switch 15 is open, second phase comparator 12 suspends operation and output transistors 16 and 17 are turned off. With transistors 16 and 17 turned off, current is cut off from resistor 130 of control circuit 13. A current Io is supplied through the collector of current source transistor 18.

Figures 6A, 6B:
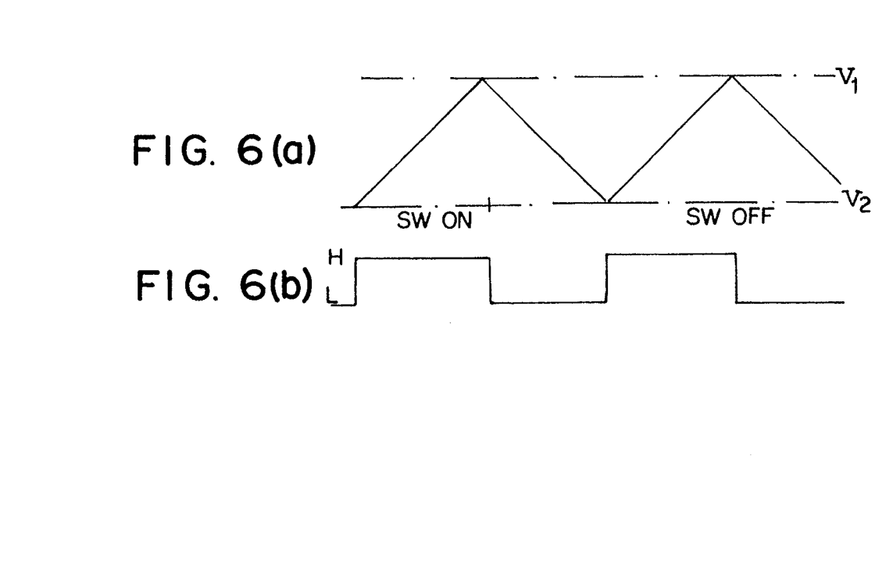
FIGS. 6(a) and 6(b) are wave forms to which reference will be made in describing the function of the circuit in FIG. 5.

The emitter area of a first current source transistor 19 is twice as large as the emitter area of other transistors thereby constituting a current mirror circuit. Consequently, the current passing through first current source transistor 19 is 2×Io while the current passing through a second current source transistor 20 is Io. Also, a terminal voltage of a charging/discharging capacitor 21 is compared with standard voltages V1 and V2 of respective comparators 22 and 23. As capacitor 21 charges and discharges past the standard voltages V1 and V2, the outputs of comparators 22 and 23 reset and set a RS flip-flop 24. The direct output Q of RS flip-flop 24 controls the opening and closing of a switch 25. A square-wave output (FIG. 6(b)) is produced at an output terminal 26. The saw-tooth oscillating terminal voltage in capacitor 21 is shown in FIG. 6(a).

During the period when the run-in clock is present, switch 15 of second phase comparator 12 is closed thereby actuating second phase comparator 12. The result of the phase comparison of the run-in clock and 90-degree phase shifted voltage controlled oscillator 6 output signal (with frequency 32 fH) occurs in respective collectors of transistors 16 and 17.

Figure 7A:
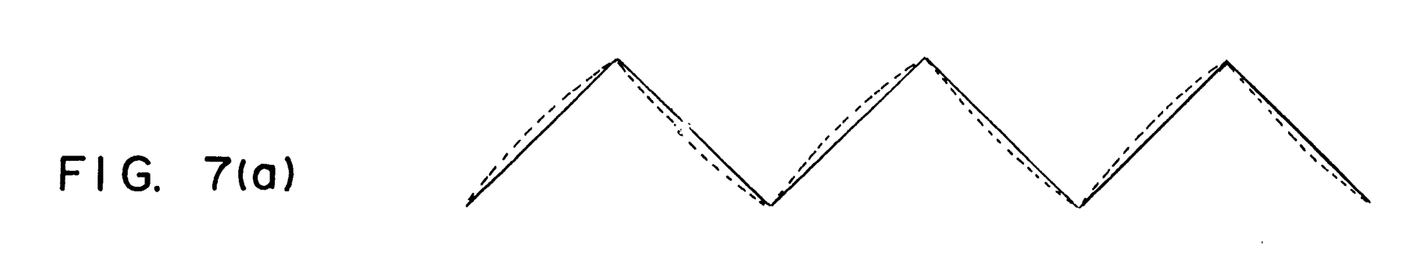
FIGS. 7(a) through 7(e) are further wave forms in FIG. 5.
Figure 7B:
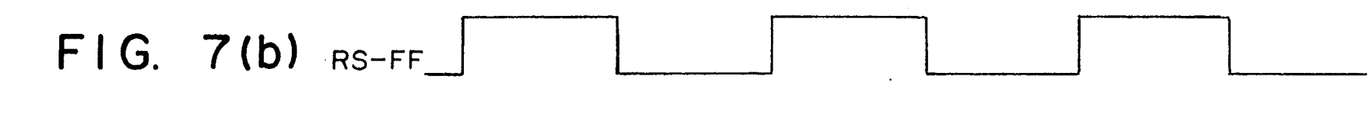
Figure 7C:
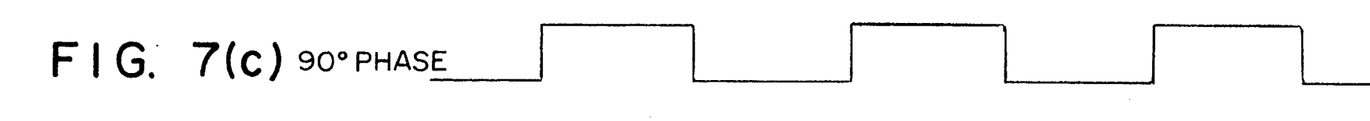
Figure 7D:
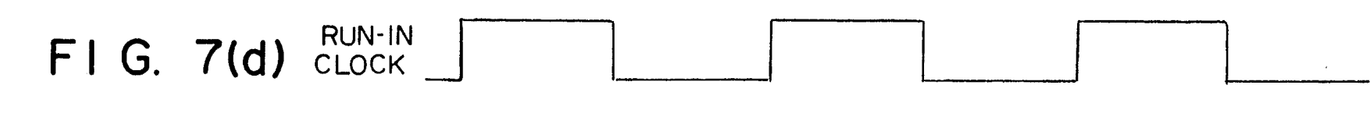

Referring now to FIGS. 7(a) to 7(e), during periods other than the run-in clock, the voltage on capacitor 21 is represented by the solid-line saw-shaped oscillating output (FIG. 7(a)). The output of RS flip-flop 24, shown in FIG. 7(b) is shifted 90-degrees by phase shifter 11 (FIG. 1) to produce the resulting phase-shifted output shown in FIG. 7(c). Quadrature detection is performed on the run-in clock portion of the television signal (FIG. 7(d)) connected through switch 10 and the 90-degree phase-shifted output of phase shifter 11 to produce the detected output shown in FIG. 7(e). The input end of resistor 130 of control circuit 13 receives an alternating voltage equal to that of the collectors of transistors 16 and 17, i.e., +VCC or ground. The duty ratio of this alternating voltage determines the phase correction, as is explained below.

When the emitter voltage of current source transistor 18 (FIG. 5) equals +VCC/2, an error current $\Delta I = (+VCC/2)/R$ flows in resistor 130. Since transistor 16 is ON during a high-level period (FIG. 7(e)), a current $Io + \Delta I$ flows in the collector of current source transistor 18. The current in current source transistor 18 causes the rising portions of the saw-shaped charging curve in capacitor 21 to curve slightly, as indicated in the dashed curve in FIG. 7(a).

Since transistor 17 is ON during a low-level period, a current $Io - \Delta I$ flows in the collector of current source transistor 18 during this time. Consequently, the straight solid-line descending portions of the saw-tooth shaped wave is replaced by the slightly curved descending portions of the saw-tooth wave as indicated in the dotted line shown in FIG. 7(a). When the phases of the two inputs to second phase comparator 12 are in coincidence, then the dashed and dotted lines shown in FIG. 7(a) produce a saw-tooth curve that is very similar to the solid-line version.

Figure 7E:
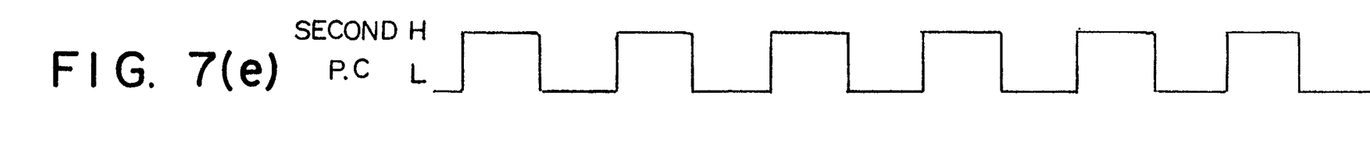
Figure 8A:
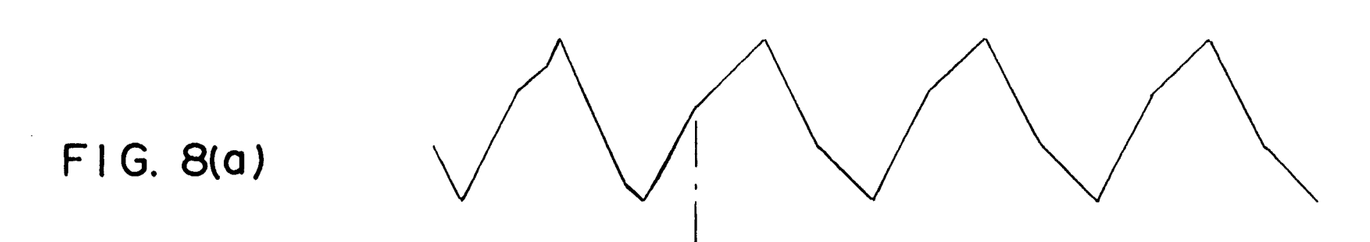
FIGS. 8(a) through 8(e) are still further wave forms in FIG. 5.
Figure 8B:
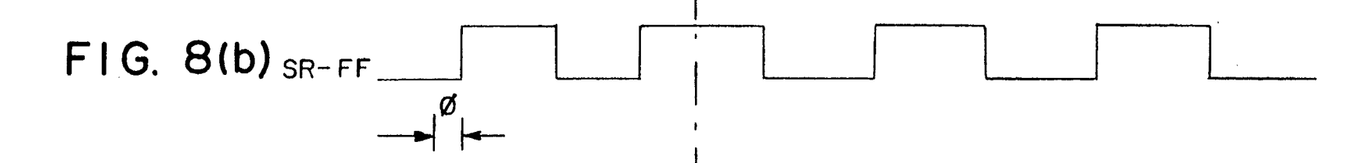
Figure 8C:
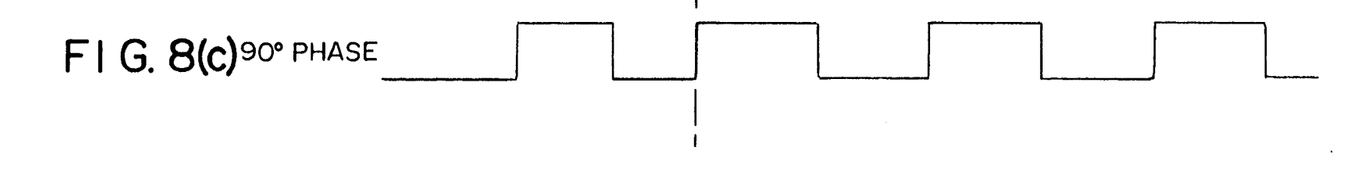
Figure 8D:
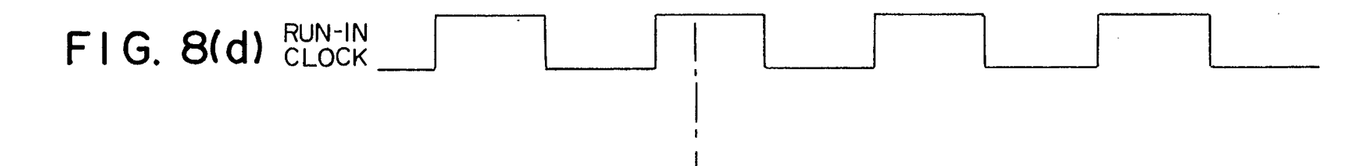
Figure 8E:
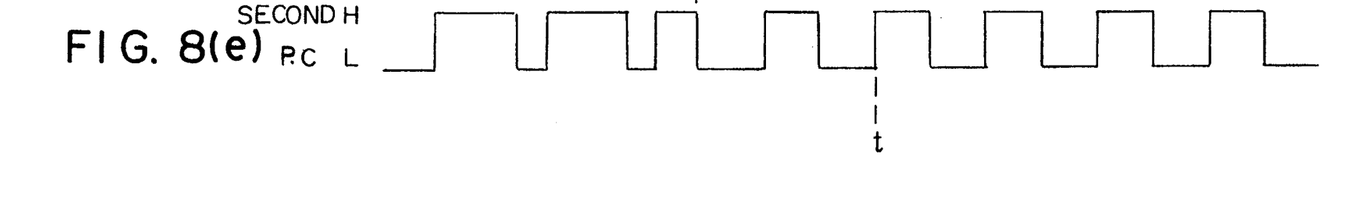

Referring now to FIGS. 8(a) to 8(e), if the phase of the run-in clock signal is shifted an angle Θ from its desired phase coincident with the phase of the 32 fH voltage controlled oscillator output signal, rapid correction of the phase error occurs within the period of the run-in clock. FIGS. 8(a) to 8(e) correspond to FIGS. 7(a) to 7(e). A phase comparison of the signals depicted in FIGS. 8(c) FIG. 8(d) produces the result shown in FIG. 8(e). It will be noted that, initially, the positive alternations in the output of second phase comparator 12 are substantially longer than are the negative alternations. The predominantly positive signal, connected through resistor 130 of control circuit 13, steepens the positive-going charging rate, and shallows the negative-going charging rate, of the charge/discharge capacitor 21 as shown in FIG. 8(a). As a result, the phase of alternation of RS flip flop 24 is correspondingly shifted until, within a few cycles, the detected output of FIG. 8(e) is returned to approximately equal positive and negative alternations, indicating phase coincidence between the run-in clock and the 32 fH clock signal from voltage controlled oscillator 6.

In a first cycle of the signal shown in FIG. 8(e), the duty cycle of the pulse differs from 50% as compared with the signal in FIG. 7(e). In FIG. 8(e), the high level ratio is greater than the low level ratio. Therefore, the positive-going period of the signal of the saw-tooth shaped wave shown in FIG. 8(a), becomes longer when the current $\Delta I$ is added compared to the negative-going period when a current is subtracted. This causes the phase of the sawtooth shaped wave in FIG. 8(a) to shift forward gradually with time, as does the phase of the pulse in FIG. 8(b) whereby eventually, their respective phases become synchronized at time t.

The output signal of second phase comparator 12 is, as shown in FIG. 5, applied directly to voltage controlled oscillator 6 through resistor 130, without integration. This is in contrast to the operation of most phased locked loop circuits, where the signals for phase comparison are integrated and the voltage controlled oscillator is controlled by the average value of the error signal. This requirement in conventional phased locked loop circuits produces slow response to phase errors.

However, as shown in FIG. 2(a), the run-in clock is present only in the single horizontal scanning period 21 H within the vertical blanking period of the TV signal. Because of this arrangement, a relatively long time, i.e., 1/30 or 1/60 seconds, elapses between run-in clocks. If phase control were to depend on integrating this periodic signal, a very large time constant is necessary (either a large capacitor or a small charging resistor) which is inconvenient. Further, as shown in FIG. 2(a), because the caption data is placed in the signal immediately after the occurrence of the run-in clock, it is desirable for the phased locked loop to respond to the phase comparison immediately.

The present invention precludes the need for an integration circuit whereby the phase comparison data is applied directly to voltage controlled oscillator 6. The lack of an integration section increases the frequency range of voltage controlled oscillator 6, whereby the time for obtaining phase coincidence in the phased locked loop is shortened. As a result, the phase of the signal synthesized in voltage controlled oscillator 6 is quickly phase locked with the run-in clock.

When the 22nd horizontal synchronizing signal (22 H) of the vertical period, as depicted in FIG. 2(a), is phase compared without integrating the output of second phase comparator 12, the phase of voltage controlled oscillator 6 returns to normal (its initial phase) in accord to its control voltage whereby the phase information carried by the run-in clock signal disappears. However, the process is not necessary when the 22 H horizontal synchronizing signal occurs because 22 H carries no caption data, and phase locking to the run-in clock is necessary only when attempting to interpret the caption data.

Figure 9:
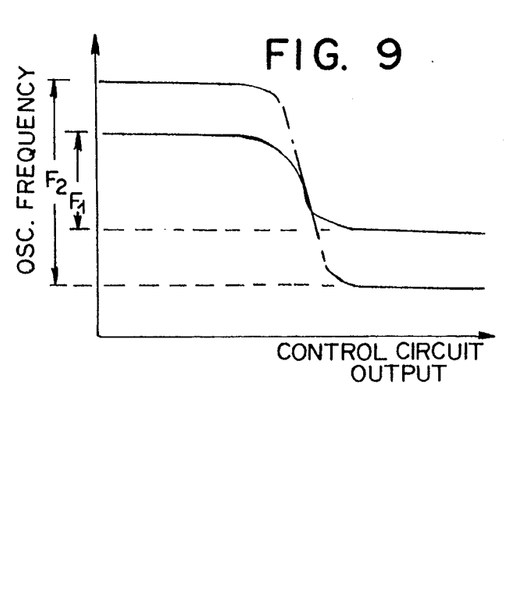
FIG. 9 is a graph showing a relationship between an oscillating frequency range and a control voltage, showing the result of using voltage controlled oscillator's with different variable frequency ranges.

FIG. 9 shows tuning frequency ranges F2 and F1, where frequency range F2 is greater than frequency range F1. The output of control circuit 13 causes a voltage controlled oscillator with frequency range F2 to vary more quickly than is the case for a voltage controlled oscillator having a frequency range F1. The wider frequency range F2 permits the Phase Lock Loop (PLL) to achieve phase lock almost immediately. Voltage controlled oscillator 6 (FIG. 5) has the broad frequency range of F2 in FIG. 9, and thus is capable of providing a clock for sampling the caption data in 21 H of the TV signal.

In the foregoing embodiment, the control current is $+\Delta I$, but is not limited thereto. If the control current is different, however, it may be necessary to lock the respective pulse phases depicted in FIGS. 7(c) and 7(d)

in a condition other than 90 degrees. One skilled in the art, with the present disclosure for reference would know exactly how to achieve such a condition.

As discussed above, according to this invention, the phase output of the automatic frequency control circuit is synchronized with the vertical synchronizing signal and the run-in clock, thereby enabling a clock signal to be obtained which is exactly synchronized with the caption data from the intermediate frequency amplifying circuit. Further, since the output of the phase comparator can be applied directly to voltage controlled oscillator through the control circuit, a low pass filter, with its attendant delay, can be omitted. By varying the ratio of control current $\pm \Delta I$ to be added to voltage controlled oscillator, it is easy to regulate the phase of the clock signal.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for receiving and decoding caption data multiplexed within a television signal and displaying character information contained in said data on a television screen, comprising:
   means for defining a particular horizontal interval containing caption data;
   an automatic frequency control circuit;
   said automatic frequency control circuit including a voltage controlled oscillator;
   means for permitting said voltage controlled oscillator to lock onto a phase of a horizontal synchronizing signal in said television signal;
   means for extracting a run-in clock signal in said particular horizontal interval;
   means for phase-comparing said run-in clock signal with an output signal of said voltage controlled oscillator;
   said means for phase-comparing producing an oscillating control signal in response to a detected phase difference;
   a control circuit receiving said oscillating control signal and applying said oscillating control signal to said voltage controlled oscillator; and
   a decoder circuit for decoding said caption data responsive to said output signal of said voltage controlled oscillator.

2. A device according to claim 1, wherein said control circuit is a resistor.

3. A device according to claim 1, wherein said oscillating control signal varies from a predetermined duty ratio in response to a difference in said phase comparison.

4. A device for receiving and decoding closed caption broadcasting data multiplexed within a television signal and displaying character information contained in said data on a television screen, comprising:
   a synchronizing/separator circuit for separating a horizontal synchronizing signal and a vertical synchronizing signal contained within said television signal;
   an automatic frequency control circuit;
   said automatic frequency control circuit including a voltage controlled oscillator having means for charging and discharging a capacitor from current sources;
   an output frequency of said voltage controlled oscillator being controlled by a charging and discharging rate of said capacitor;
   a first phase comparator;
   said first phase comparator receiving said horizontal synchronizing signal and an output of said voltage controlled oscillator at said output frequency, and including means for producing an error signal in response to differences in its inputs;
   a low pass filter receiving said error signal and producing a filtered error signal;
   said automatic frequency control circuit being responsive to said filtered error signal for locking said output and said horizontal synchronizing signal in phase;
   means for extracting a run-in clock signal encoded within said television signal;
   a second phase comparator for phase-comparing said extracted run-in clock signal with an output signal of said voltage controlled oscillator;
   a control circuit for varying said voltage controlled oscillator output signal, via said means for charging and discharging, according to an output signal of said second phase comparator such that said output frequency is varied so as to track a frequency of said run-in signal; and
   a decoder circuit for decoding said caption data responsive to said output signal of said voltage controlled oscillator.

5. A device according to claim 4, wherein said control circuit is a resistor.

6. A device for phase locking a signal to a run-in clock following a horizontal sync signal in a predetermined horizontal line in a television signal, comprising:
   separating means for extracting said horizontal sync signal, a vertical sync signal, and said run-in clock from an IF video signal;
   a first phase lock loop;
   said first phase-lock loop including a voltage controlled oscillator producing a first output signal at a first frequency and means for producing a second output signal at a second frequency divided down from said first frequency;
   said first phase lock loop locking said second output signal tosaid horizontal sync signal;
   means for producing a gate signal coincident with a duration of said run-in signal;
   a second phase lock loop including said voltage controlled oscillator;
   said second phase lock loop being enabled by said gate signal; and
   said second phase lock loop locking said first output signal to said run-in clock during an occurrence of said gate signal.

7. A device according to claim 6, further comprising:
   said first phase lock loop including a first phase detector;
   said second phase lock loop including a second phase detector; and
   means for coupling outputs of both said first and said second phase detectors to said voltage controlled oscillator.

* * * * *